(12) United States Patent
Huang et al.

(10) Patent No.: US 11,584,613 B2
(45) Date of Patent: Feb. 21, 2023

(54) DETERMINATION FOR MOTION OF PASSENGER OVER ELEVATOR LANDING AREA

(71) Applicant: Otis Elevator Company, Farmington, CT (US)

(72) Inventors: Wenbo Huang, Shanghai (CN); Xiaofei Guo, Shanghai (CN)

(73) Assignee: OTIS ELEVATOR COMAPNY, Farmington, CT (US)

( * ) Notice: Subject to any disclaimer, the term of this patent is extended or adjusted under 35 U.S.C. 154(b) by 1280 days.

(21) Appl. No.: 16/015,490

(22) Filed: Jun. 22, 2018

(65) Prior Publication Data

US 2018/0370760 A1    Dec. 27, 2018

(30) Foreign Application Priority Data

Jun. 23, 2017 (CN) .......................... 201710484975.X
May 10, 2018 (CN) .......................... 201810442856.2

(51) Int. Cl.
*B66B 1/46* (2006.01)
*B66B 1/34* (2006.01)
(Continued)

(52) U.S. Cl.
CPC ............ *B66B 1/468* (2013.01); *B66B 1/3407* (2013.01); *B66B 1/3461* (2013.01);
(Continued)

(58) Field of Classification Search
CPC ............ B66B 1/468; B66B 2201/4653; B66B 1/3461; B66B 2201/4615;
(Continued)

(56) References Cited

U.S. PATENT DOCUMENTS 5,219,042 A    6/1993  Sattar et al.
5,435,416 A    7/1995  Siikonen et al.
(Continued)

FOREIGN PATENT DOCUMENTS

CN    101875457 A    11/2010
CN    104276462 A    1/2015
(Continued)

OTHER PUBLICATIONS

European Search Report for Application No. 18178834.0 dated May 5, 2020; 6 Pages.

(Continued)

*Primary Examiner* — Marlon T Fletcher
(74) *Attorney, Agent, or Firm* — Cantor Colburn LLP

(57) ABSTRACT

The present invention relates to determining the movement of a passenger relative to an elevator landing area, which belongs to the field of elevator intelligent control technologies. An automatic elevator calling system of the present invention comprises: a first wireless signal module installed in an elevator car, which is used for broadcasting a first wireless signal; wherein the first wireless signal module is further used for receiving information regarding the movement of a passenger relative to the elevator car, and the information regarding the movement is determined based on the change in a signal strength of the first wireless signal received by a personal mobile terminal carried by the passenger.

21 Claims, 3 Drawing Sheets

(51) Int. Cl.
  *H04W 4/02* (2018.01)
  *H04W 4/80* (2018.01)
  *H04L 67/12* (2022.01)
  *H04W 4/33* (2018.01)
(52) U.S. Cl.
  CPC ........... *B66B 1/3492* (2013.01); *H04W 4/023* (2013.01); *B66B 2201/4638* (2013.01); *B66B 2201/4653* (2013.01); *H04L 67/12* (2013.01); *H04W 4/027* (2013.01); *H04W 4/33* (2018.02); *H04W 4/80* (2018.02)
(58) Field of Classification Search
  CPC ...... B66B 2201/4638; B66B 2201/103; B66B 1/3492; B66B 5/0012; B66B 2201/4623; B66B 2201/104; B66B 2201/405; B66B 2201/463; B66B 5/0006; B66B 19/06; B66B 2201/212; B66B 2201/403; B66B 2201/4607; B66B 1/46
  See application file for complete search history.

(56) References Cited

U.S. PATENT DOCUMENTS

| | | | |
|---|---|---|---|
| 5,518,086 A | 5/1996 | Tyni | |
| 5,984,051 A | 11/1999 | Morgan et al. | |
| 6,109,396 A | 8/2000 | Sirag et al. | |
| 6,202,799 B1 | 3/2001 | Drop | |
| 6,209,685 B1* | 4/2001 | Zaharia | B66B 1/468 187/388 |
| 6,257,373 B1 | 7/2001 | Hikita et al. | |
| 6,382,363 B1 | 5/2002 | Friedli | |
| 6,397,976 B1 | 6/2002 | Hale et al. | |
| 6,707,374 B1 | 3/2004 | Zaharia | |
| 6,945,365 B2 | 9/2005 | Matela | |
| 7,258,203 B2 | 8/2007 | De Jong et al. | |
| 7,272,394 B2 | 9/2007 | Krishnakumar et al. | |
| 8,047,333 B2 | 11/2011 | Finschi | |
| 8,944,219 B2 | 2/2015 | Gerstenkorn | |
| 9,079,751 B2 | 7/2015 | Sundholm et al. | |
| 9,139,401 B2 | 9/2015 | Finschi et al. | |
| 9,382,095 B2 | 7/2016 | Rusanen et al. | |
| 9,469,500 B2 | 10/2016 | Friedli | |
| 9,483,887 B1 | 11/2016 | Soleimani | |
| 2007/0041352 A1* | 2/2007 | Frankel | B66B 1/468 370/338 |
| 2015/0251874 A1* | 9/2015 | Salmikuukka | B66B 1/2408 187/380 |
| 2015/0281910 A1 | 10/2015 | Choudhury et al. | |
| 2015/0344265 A1 | 12/2015 | Hakonen et al. | |
| 2016/0031676 A1 | 2/2016 | Haipus | |
| 2016/0356605 A1 | 12/2016 | Zur et al. | |
| 2017/0057781 A1* | 3/2017 | DePaola | B66B 1/468 |
| 2017/0064514 A1 | 3/2017 | Alles et al. | |
| 2018/0370758 A1* | 12/2018 | Huang | B66B 1/2408 |
| 2018/0370760 A1* | 12/2018 | Huang | B66B 1/3461 |
| 2018/0370761 A1* | 12/2018 | Huang | H04W 4/06 |
| 2019/0002237 A1* | 1/2019 | Scoville | B66B 1/468 |
| 2019/0023527 A1* | 1/2019 | Larmuseau | B66B 1/468 |
| 2019/0152741 A1* | 5/2019 | Wedzikowski | B66B 1/2408 |
| 2019/0161318 A1* | 5/2019 | Wedzikowski | B66B 1/2408 |
| 2019/0185291 A1* | 6/2019 | Larmuseau | H04W 52/283 |
| 2019/0193988 A1* | 6/2019 | Huang | B66B 1/468 |
| 2019/0193989 A1* | 6/2019 | Huang | H04W 4/33 |
| 2019/0202657 A1* | 7/2019 | Li | G06F 1/1698 |
| 2019/0263627 A1* | 8/2019 | Huang | B66B 1/468 |
| 2019/0276273 A1* | 9/2019 | Zhang | H04W 48/12 |
| 2019/0276274 A1* | 9/2019 | Yang | G06Q 50/163 |
| 2019/0276275 A1* | 9/2019 | Yang | B66B 1/468 |
| 2019/0292010 A1* | 9/2019 | Li | H04W 4/80 |
| 2020/0130993 A1* | 4/2020 | Scoville | B66B 1/3461 |
| 2020/0165099 A1* | 5/2020 | Kuenzi | B66B 1/468 |
| 2020/0239277 A1* | 7/2020 | Larmuseau | H04W 4/024 |
| 2020/0277159 A1* | 9/2020 | Larmuseau | H04W 4/80 |

FOREIGN PATENT DOCUMENTS

| | | |
|---|---|---|
| CN | 204980676 U | 1/2016 |
| CN | 105635956 A | 6/2016 |
| CN | 106365001 A | 2/2017 |
| EP | 2046087 A1 | 4/2009 |
| EP | 2947033 A1 | 11/2015 |
| EP | 3116200 A2 | 1/2017 |
| EP | 3431429 A1 | 1/2019 |
| JP | 2003226473 A | 8/2003 |
| JP | 2012062190 A | 3/2012 |
| WO | 2017024096 A1 | 2/2017 |
| WO | 2017090187 A1 | 6/2017 |

OTHER PUBLICATIONS

Chinese Office Action for Application No. 201810442856.2; dated May 25, 2021; 11 Pages.

European Search Report for application EP 18178834, dated Nov. 27, 2018, 34 pages.

* cited by examiner

DETERMINATION FOR MOTION OF PASSENGER OVER ELEVATOR LANDING AREA

FOREIGN PRIORITY

This application claims priority to Chinese Patent Application No. 201810442856.2, filed May 10, 2018, and Chinese Patent Application No. 201710484975.X, filed Jun. 23, 2017, and all the benefits accruing therefrom under 35 U.S.C. § 119, the contents of which in its entirety are herein incorporated by reference.

TECHNICAL FIELD

The present invention belongs to the field of Elevator intelligent control technologies and relates to determining the movement of a passenger relative to an elevator landing area by using wireless interaction between a wireless signal module installed in an elevator car and a personal mobile terminal.

BACKGROUND ART

In existing elevator systems, one common elevator calling operation manner is as follows: a passenger manually presses a certain elevator calling button on an elevator calling control panel installed in one elevator landing area to input an elevator calling request command for traveling upward or traveling downward; then after entering a certain elevator car, the passenger manually presses a certain floor button on a destination floor registration control panel installed in each elevator car to input a destination floor. Such an elevator calling operation manner needs to be completed manually, and especially when the passenger cannot freely press the button as above with two hands (for example, when the passenger is carrying things in two hands or the passenger who is unable to walk sits on a wheelchair), the elevator calling operation becomes difficult, which affects passengers' experience.

With the development of automatic elevator calling operation technology, various technologies for automatically achieving an elevator calling operation by using a smart mobile terminal such as a mobile phone have emerged. However, due to the uncertainty of the passenger's action or movement, it might be easy to cause an ineffective elevator calling.

SUMMARY OF THE INVENTION

According to a first aspect of the present invention, there is provided an automatic elevator calling system. The automatic elevator calling system comprises: a first wireless signal module installed in an elevator car, which is used for broadcasting a first wireless signal; wherein the first wireless signal module is further used for receiving information regarding the movement of a passenger relative to an elevator landing area, and the information regarding the movement is determined based on the change in a signal strength of the first wireless signal received by a personal mobile terminal carried by the passenger.

In the automatic elevator calling system according to one embodiment of the present invention, the information regarding the movement comprises the movement of the passenger from the elevator car into the elevator landing area, which is determined when: the signal strength of the first wireless signal received by the personal mobile terminal changes from greater than or equal to a relatively strong first predetermined value to zero or relatively weak.

In the automatic elevator calling system according to one embodiment of the present invention, the first wireless signal further comprises a data signal of current traveling direction information of the elevator car, wherein the traveling direction information comprises: "travel upward", "travel downward", and "not traveled"; and the information regarding the movement comprises the movement of the passenger from the elevator car into the elevator landing area after the passenger takes the elevator, which is determined when: the signal strength of the received first wireless signal changes from greater than or equal to the relatively strong first predetermined value to zero or relatively weak and the traveling direction information received prior to the change changes from "travel upward" or "travel downward" to "not traveled".

In the automatic elevator calling system according to one embodiment of the present invention, the first wireless signal comprises the data signal of the information of the first floor where the elevator car is currently located; wherein the information regarding the movement comprises the movement of the passenger from the elevator car into the elevator landing area after the passenger takes the elevator, which is determined when: the signal strength of the first wireless signal received by the personal mobile terminal changes from greater than or equal to the relatively strong first predetermined value to zero or relatively weak and the first floor information received by the personal mobile terminal upon the change differs from the first floor information received prior to the change.

In the automatic elevator calling system according to one embodiment of the present invention, the automatic elevator calling system further comprises: a second wireless signal module installed in the elevator landing area, which is used for broadcasting a second wireless signal, the second wireless signal comprising a data signal of information of a second floor where the second wireless signal module is located.

In the automatic elevator calling system according to one embodiment of the present invention, the first wireless signal comprises the data signal of the information of the first floor where the elevator car is currently located; wherein the information regarding the movement comprises the movement of the passenger from the elevator car into the elevator landing area where the second wireless signal module is installed after the passenger takes the elevator, which is determined when: the signal strength of the received first wireless signal changes from greater than or equal to the relatively strong first predetermined value to zero or relatively weak, second floor information of the second wireless signal is not received prior to the change, and the second floor information of the second wireless signal received after the change does not differ from the first floor information of the first wireless signal received previously.

In the automatic elevator calling system according to one embodiment of the present invention, the information regarding the movement comprises the movement of the passenger to a location that is substantially outside the elevator landing area, which is determined when: a signal strength of the second wireless signal received by the personal mobile terminal changes from greater than or equal to a second predetermined value to zero or relatively weak.

In the automatic elevator calling system according to one embodiment of the present invention, the automatic elevator calling system further comprises: a second wireless signal module installed in the elevator landing area, which is used for broadcasting a second wireless signal and automatically establishing a second wireless connection with the personal mobile terminal based on the second wireless signal, and receiving, upon the establishment of the second wireless connection, an elevator calling request command regarding an elevator calling direction transmitted from the personal mobile terminal.

In the automatic elevator calling system according to one embodiment of the present invention, the first wireless signal module is further used for automatically establishing a first wireless connection with the personal mobile terminal based on the first wireless signal, and receiving, upon the establishment of the first wireless connection, a destination floor registration command transmitted from the personal mobile terminal.

In the automatic elevator calling system according to one embodiment of the present invention, the second wireless signal module and/or the first wireless signal module is a Bluetooth low energy module.

According to a second aspect of the present invention, there is provided an elevator system. The elevator system comprises: the automatic elevator calling system according to any of the above paragraphs; and an elevator controller, which is used for controlling running of one or more elevator cars in the elevator system.

In the elevator system according to one embodiment of the present invention, the elevator controller is configured to judge whether or not to cancel an elevator calling request command corresponding to the personal mobile terminal of the passenger based on the information regarding the movement.

According to a third aspect of the present invention, there is provided a method for determining the movement of a passenger relative to an elevator landing area. The method comprises steps of: receiving a first wireless signal, wherein the first wireless signal is broadcasted from an elevator car; determining a signal strength of the received first wireless signal; and determining the movement of the passenger relative to the elevator landing area based on the change in the signal strength of the first wireless signal.

In the method according to one embodiment of the present invention, in the step of determining the movement, the movement of the passenger from the elevator car into the elevator landing area is determined when the signal strength of the received first wireless signal changes from greater than or equal to a relatively strong first predetermined value to zero or relatively weak.

In the method according to one embodiment of the present invention, the first wireless signal further comprises a data signal of current traveling direction information of the elevator car, wherein the traveling direction information comprises: "travel upward", "travel downward", and "not traveled"; and in the step of determining the movement, the movement of the passenger from the elevator car into the elevator landing area after the passenger takes the elevator is determined when the signal strength of the received first wireless signal changes from greater than or equal to the relatively strong first predetermined value to zero or relatively weak and the traveling direction information received prior to the change changes from "travel upward" or "travel downward" to "not traveled".

In the method according to one embodiment of the present invention, the first wireless signal comprises a data signal of information of a first floor where the elevator car is currently located; andin the step of determining the movement, the movement of the passenger from the elevator car into the elevator landing area after the passenger takes the elevator is determined when the signal strength of the received first wireless signal changes from greater than or equal to the relatively strong first predetermined value to zero or relatively weak and the first floor information received upon the change differs from the first floor information received prior to the change.

In the method according to one embodiment of the present invention, the method further comprises a step of receiving a second wireless signal, wherein the second wireless signal is broadcasted from a location point in the elevator landing area outside the elevator car, and the second wireless signal comprises a data signal of information of a second floor where the second wireless signal module is located.

In the method according to one embodiment of the present invention, the first wireless signal comprises a data signal of information of a first floor where the elevator car is currently located; wherein in the step of determining the movement, the movement of the passenger from the elevator car into the elevator landing area where the second wireless signal module is located after the passenger takes the elevator is determined when the signal strength of the received first wireless signal changes from greater than or equal to the relatively strong first predetermined value to zero or relatively weak, second floor information of the second wireless signal is not received prior to the change, and the second floor information of the second wireless signal received after the change does not differ from the first floor information of the first wireless signal received previously.

In the method according to one embodiment of the present invention, the method further comprises determining a signal strength of the received second wireless signal.

In the method according to one embodiment of the present invention, the method further comprises a step of determining the movement of the passenger to a location that is substantially outside the elevator landing area when the signal strength of the received second wireless signal changes from greater than or equal to a second predetermined value to zero or relatively weak.

In the method according to one embodiment of the present invention, the method further comprises a step of automatically entering a sleep mode when the movement of the passenger to the location that is substantially outside the elevator landing area is determined.

In the method according to one embodiment of the present invention, the signal strength of the first wireless signal changing from greater than or equal to the relatively strong first predetermined value to zero or relatively weak refers to substantially progressively changing from greater than or equal to the relatively strong first predetermined value to zero or relatively weak.

In the method according to one embodiment of the present invention, transmission of an elevator calling request command regarding an elevator calling direction is suspended when the movement of the passenger from the elevator car into the elevator landing area is determined.

In the method according to one embodiment of the present invention, a third wireless connection is actively established with the corresponding second wireless signal module installed in the elevator landing area when the movement of the passenger from the elevator car into the elevator landing area is determined, so as to transmit a determination result that the passenger moves from the elevator car into the elevator landing area.

According to a fourth aspect of the present invention, there is provided a computer apparatus. The computer apparatus comprises a memory, a processor, and a computer program stored on the memory and executable on the processor, wherein the processor executes the program to achieve steps of the method according to any of the above paragraphs.

According to a fifth aspect of the present invention, there is provided a computer-readable storage medium having a computer program stored thereon, wherein the program is executable by a processor to achieve steps of the method according to any of the above paragraphs.

According to a sixth aspect of the present invention, there is provided a method for determining the movement of a passenger relative to an elevator landing area. The method comprises steps of: broadcasting a first wireless signal by a first wireless signal module installed in an elevator car; and receiving information regarding the movement of the passenger relative to the elevator landing area, the information regarding the movement being determined based on the change in a signal strength of the first wireless signal received by a personal mobile terminal carried by the passenger. According to a seventh aspect of the present invention, there is provided an apparatus for determining the movement of a passenger relative to an elevator landing area, wherein the apparatus determines, by using a personal mobile terminal carried by the passenger, a value of a signal strength of a first wireless signal received by the personal mobile terminal, the first wireless signal being broadcasted from an elevator car. The apparatus comprises: a movement determination module, which is configured to determine information regarding the movement of the passenger relative to the elevator landing area based on the change in the signal strength of the first wireless signal.

The above features and operations of the present invention will be more apparent from the following description and the accompanying drawings.

DESCRIPTION OF THE DRAWINGS

The above and other objects and advantages of the present invention will be more complete and apparent from the following detailed description taken in conjunction with the accompanying drawings, in which the same or similar elements are denoted by the same reference numerals.

DETAILED DESCRIPTION

The present invention will now be described more fully with reference to the accompanying drawings, in which exemplary embodiments of the present invention are shown. However, the present invention may be achieved in many different forms and should not be construed as being limited to the embodiments set forth herein. Conversely, these embodiments are provided to make this disclosure thorough and complete, and fully convey the concept of the present invention to those skilled in the art.

Some of block diagrams shown in the figures are functional entities and do not necessarily have to correspond to physically or logically independent entities. These functional entities may be implemented in a software form, or implemented in one or more hardware modules or integrated circuits, or implemented in different processing apparatuses and/or microcontroller apparatuses.

Herein, for the convenience of description, "an apparatus for determining the movement of a passenger relative to an elevator landing area" is simply referred to as a "movement determination apparatus", and "a method for determining the movement of a passenger relative to an elevator landing area" is simply referred to as a "movement determination method".

Figure 1:
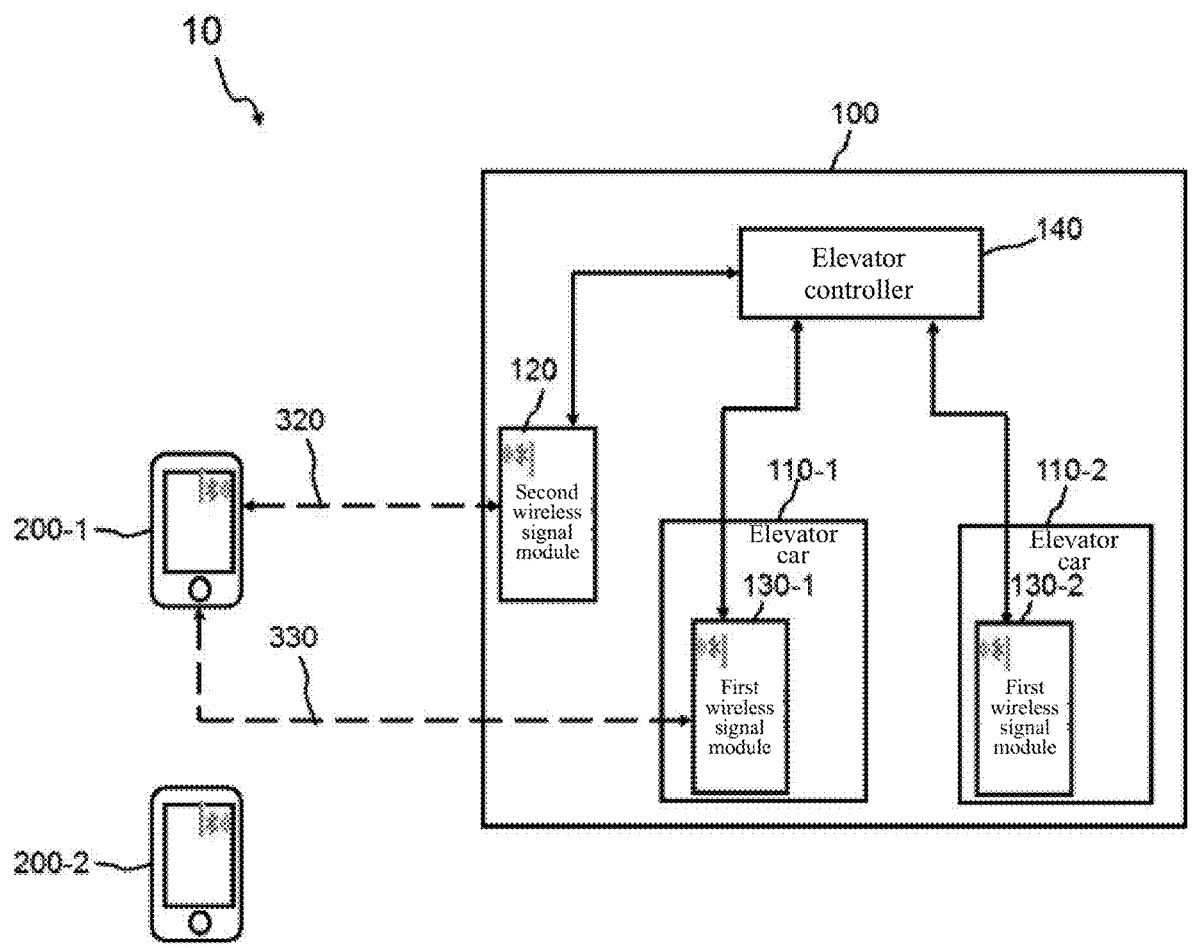
FIG. 1 is a schematic diagram of an automatic elevator calling system according to one embodiment of the present invention, in which an elevator system according to one embodiment of the present invention is also shown.
Figure 2:
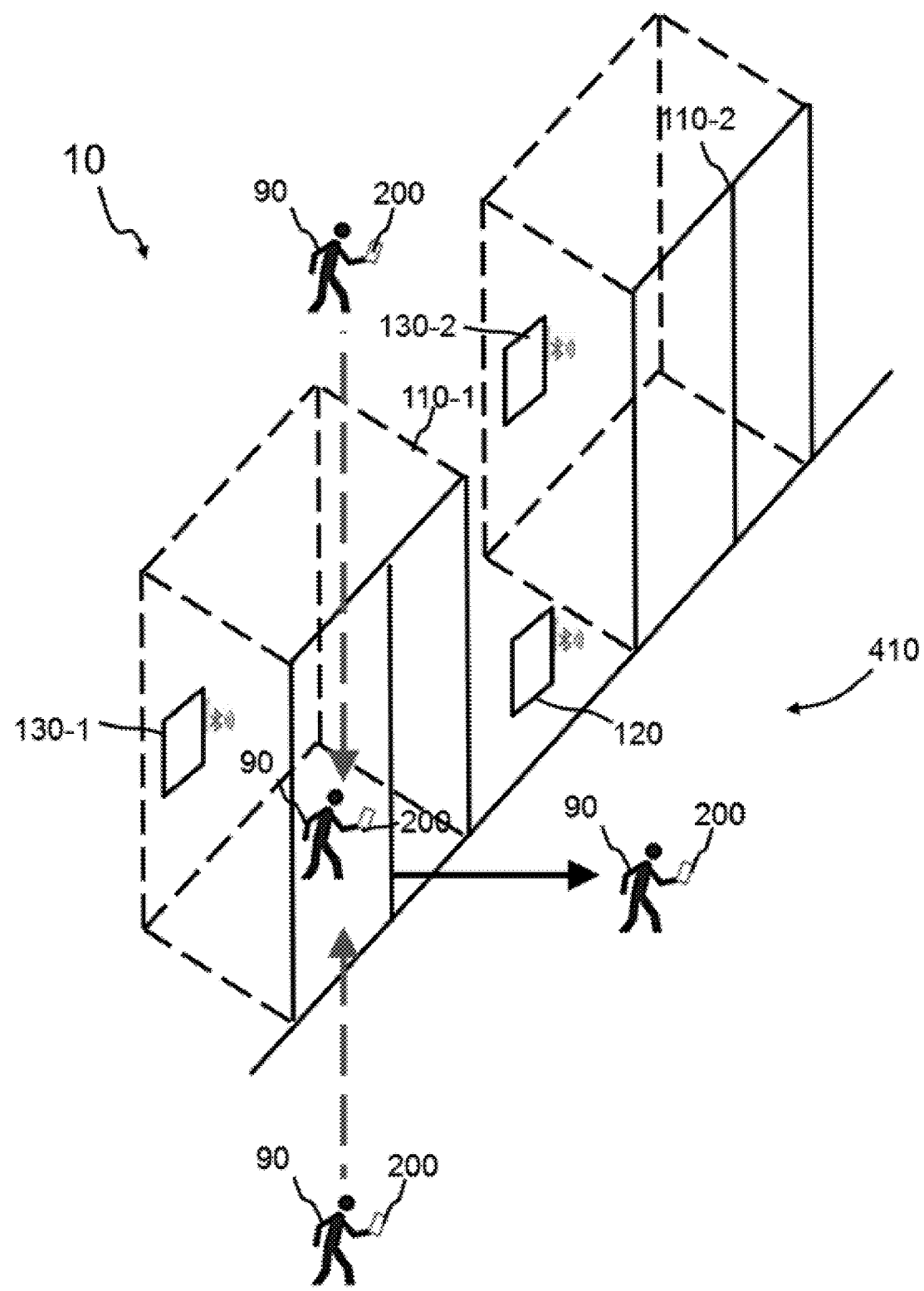
FIG. 2 is a schematic diagram of an application scenario of a movement determination apparatus according to one embodiment of the present invention.
Figure 3:
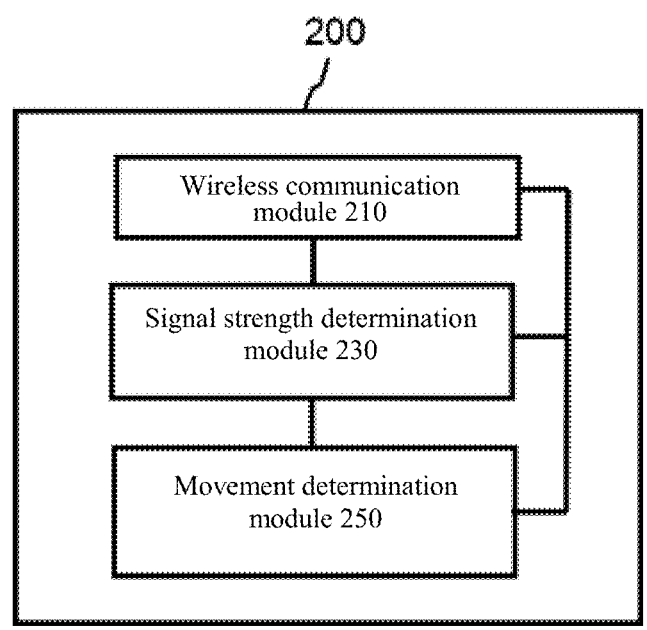
FIG. 3 exemplifies a schematic structural diagram of modules of a personal mobile terminal when a movement determination apparatus according to one embodiment of the present invention is at least partially implemented on the personal mobile terminal.

FIG. 1 shows a schematic diagram of an automatic elevator calling system according to one embodiment of the present invention; FIG. 2 shows a schematic diagram of an application scenario of a movement determination apparatus according to one embodiment of the present invention; and FIG. 3 shows a schematic structural diagram of modules of a personal mobile terminal according to one embodiment of the present invention. The movement determination apparatus, automatic elevator calling system, and elevator system of the embodiments of the present invention are exemplified below in conjunction with FIG. 1 and FIG. 3; moreover, a method for determining the movement of a passenger relative to an elevator landing area is exemplified.

A movement determination apparatus 10 of the embodiment of the present invention is implemented in an automatic elevator calling system of the embodiment shown in FIG. 1, thereby forming an automatic elevator calling system according to one embodiment of the present invention. The automatic elevator calling system is further applied to an elevator system 100 installed in a building. The elevator system 100 comprises one or more elevator cars 110 travelling upward or downward in hoist ways of the building. FIG. 1 shows two of the elevator cars, 110-1 and 110-2, of the elevator system 100. The traveling or stopping of each elevator car 110 in the hoistway, i.e., each elevator car 110, is controlled by an elevator controller 140 in the elevator system 100. The specific control manner or control principle of the elevator controller 140 for the one or more elevator cars 110 is not restrictive, and the specific structure or arrangement manner of the elevator controller 140 is also not restrictive.

It should be understood that components or modules included in the movement determination apparatus 10 according to the following embodiments of the present invention may be included in the automatic elevator calling system according to one embodiment of the present invention. For example, the automatic elevator calling system comprises a first wireless signal module 130 and/or a second wireless signal module 120.

Continuing with FIGS. 1 and 2, the movement determination apparatus 10 comprises one or more first wireless signal modules 130. Each first wireless signal module 130 is installed in each elevator car 110. For example, one first wireless signal module 130-1 is provided in the elevator car 110-1 and one first wireless signal module 130-2 is provided in the elevator car 110-2. In one embodiment, the first wireless signal module 130 is installed and integratedly provided on a destination floor registration control panel in the elevator car 110, and the specific manner of integratedly providing the first wireless signal module 130 with respect to the destination floor registration control panel is not restrictive.

The first wireless signal module 130 may specifically be a Bluetooth Low Energy (BLE) module. Correspondingly, the first wireless signal is a Bluetooth low energy signal. The first wireless signal module 130 transmits or broadcasts the first wireless signal, for example, continuously (for example, at short time intervals) broadcasts the first wireless signal. The signal strength of the broadcasted first wireless signal is attenuated with the broadcasting distance thereof, and the specific attenuation manner is not restrictive. The first wireless signal broadcasted by the first wireless signal module 130 can substantially effectively cover the area in the elevator car 110 where it is installed. The first wireless signal may correspondingly be, for example, a Bluetooth low energy signal, which may comprise a data signal of information of a first floor where the elevator car 110 is currently located.

It should be noted that the first wireless signal module 130 is coupled with the elevator controller 140. Therefore, during the running of each elevator car 110, the first wireless signal module 130 is able to obtain desired information (for example, current first floor information, traveling direction information, and the like of the elevator car 110) from the elevator controller 140 in real time, and package the first floor information and/or the traveling direction information (the traveling direction information comprises, for example, "travel upward", "travel downward", and "not traveled") into wireless data signals to be broadcasted in the form of the first wireless signal.

Continuing with FIGS. 1-3, the movement determination apparatus 10 may also be implemented at least partially by a personal mobile terminal 200 carried by a passenger 90. Personal mobile terminals 200-1 and 200-2 respectively carried by two passengers each can implement at least part of functions of the movement determination apparatus 10. Each personal mobile terminal 200 is configured to be capable of receiving the first wireless signal broadcasted by the first wireless signal module 130 when a distance condition is satisfied, as shown in FIG. 3. A wireless communication module 210 in the personal mobile terminal 200 is used for receiving the first wireless signal or other wireless signals. The wireless communication module 210 may specifically be a Bluetooth low energy module. Here, the first wireless signal may comprise the data signal of the information of the first floor where the elevator car 110 is currently located and/or the current traveling direction information of the elevator car 110.

Each personal mobile terminal 200 can determine the signal strength of the first wireless signal it receives. In one embodiment, a signal strength determination module 230 in the personal mobile terminal 200 determines the signal strength of the received first wireless signal based on the first wireless signal. For example, the personal mobile terminal 200 is configured with a Received Signal Strength Indicator (RSSI) to determine the signal strength of the first wireless signal or any other wireless signal it receives, i.e., the signal strength determination module 230 is implemented through the RSSI.

It should be understood that the signal strength of the first wireless signal received by the personal mobile terminal 200 is related to a preset effective broadcasting distance or broadcasting signal strength of the first wireless signal. In one embodiment, the effective broadcasting distance of the first wireless signal can be preset. For example, the signal strength of the first wireless signal received by the personal mobile terminal 200 will be greater than or equal to a first predetermined value under the circumstance that the personal mobile terminal 200 is at a distance of less than or equal to 0.7-1 meter from the first wireless signal module 130, then the RSSI may indicate that the signal strength of the first wireless signal is "strong", and 0.7-1 meter corresponds to the effective broadcasting distance. Therefore, the personal mobile terminal 200 carried by the passenger 90 in the elevator car 110 can receive the relatively "strong" first wireless signal, and can also simultaneously obtain the first floor information broadcasted in the first wireless signal. In other words, the personal mobile terminal 200 of the passenger 90 can obtain the first floor information of the current elevator car in real time.

In one embodiment of the present invention, a movement determination module 250 of the personal mobile terminal 200 is used for determining the movement of the passenger 90 relative to the elevator landing area 410 based on the change in the signal strength of the first wireless signal.

It should be noted that determining the movement of the passenger 90 relative to the elevator landing area 410 is very significant for the following reason: with the development of elevator intelligent control technology, the personal mobile terminal 200 carried by the passenger 90 is an intelligent terminal that realizes an automatic elevator calling operation and can automatically issue various types of elevator calling operation commands to enable the elevator controller to perform dispatch control over the elevator car. For example, the personal mobile terminal automatically issues an elevator calling command when the personal mobile terminal 200 is in or near the elevator landing area 410, and the elevator controller will control the running of the elevator car based on the elevator calling command; however, if the elevator car is parked at a certain elevator landing area, a personal mobile terminal 200 of a passenger coming out of the elevator car may also likely to automatically issue an elevator calling command, but in most cases, the passenger coming out of the elevator car generally does not need to take the elevator anymore in a short time, so the elevator calling command in this case cannot really reflect the passenger's elevator-taking demand. If the elevator calling command corresponding to the passenger 90 coming out of the elevator car is accepted by the elevator system, the elevator system might easily run ineffectively, which seriously affects the running efficiency of the elevator system.

As shown in FIG. 2, that the elevator car 110 travels upward or downward to and stops at a floor N is taken for example, wherein the floor N for example corresponds to the elevator landing area 410. The passenger 90 carrying the personal mobile terminal 200 is taking the elevator car 110-1, the first wireless signal module 130-1 in the elevator car 110-1 continuously broadcasts the first wireless signal, and the personal mobile terminal 200 of one or more passengers 90 taking the elevator continuously receives the first wireless signal. When the elevator car 110-1 arrives at the floor N and a landing door is opened, the passenger 90 will walk out of the elevator car 110-1 and move toward the elevator landing area 410. The passenger 90 will keep away from the first wireless signal module 130-1. The signal strength of the first wireless signal (broadcasted by the first wireless signal module 130-1) received by the personal mobile terminal 200 will progressively become weaker, for example, change from greater than or equal to the relatively strong first predetermined value to zero or relatively weak. The first predetermined value may indicate that the current distance from the passenger 90 to the first wireless signal module 130-1 is in the range of 0.7-1 meter. When the signal strength is greater than or equal to the first predetermined value, the passenger 90 may be probably located in the elevator car 110-1.

Therefore, in one embodiment, the first wireless signal module 130-1 continuously broadcasts the first floor information of the floor where the elevator car 110-1 is currently located through the first wireless signal. For example, in the process of the elevator car 110-1 traveling downward from a floor (N+x) to the floor N, the first wireless signal module 130-1 continuously broadcasts the first floor information of the floor (N+x) to the floor N until the elevator car 110-1 stops at the floor N, and the personal mobile terminal 200 will be able to receive the changing first floor information before the landing door is opened. After the landing door is opened, the personal mobile terminal 200 will also be able to receive the first floor information of the floor N while the personal mobile terminal 200 determines the signal strength of the received first wireless signal through the RSSI or the like. If the signal strength of the first wireless signal received by the personal mobile terminal 200 changes from greater than or equal to the relatively strong first predetermined value to zero or relatively weak and the first floor (for example, the floor N) information received by the personal mobile terminal 200 upon the change differs from the first floor (for example, the floor (N+1)) information received by the personal mobile terminal 200 prior to the change, the movement of the passenger from the elevator car 110-1 into the elevator landing area 410 after taking the elevator. Therefore, in combination with the change in the first floor information, not only can the passenger be determined to move from the elevator car 110-1 into the elevator landing area 410, but also the passenger can be determined to be taking the elevator before the movement, so as to distinguish from the situation where the passenger 90 first enters the elevator car 110-1 and then comes out of the elevator car 110-1 at the same floor. Under the circumstance where the signal strength of the first wireless signal received by the personal mobile terminal 200 changes from greater than or equal to the relatively strong first predetermined value to zero or relatively weak and the first floor (for example, the floor N) information received by the personal mobile terminal 200 upon the change does not differ from the first floor (for example, the floor N) information received by the personal mobile terminal 200 prior to the change, it is determined that the passenger 90 moves from the elevator car 110-1 into the elevator landing area 410 which does not happen after the passenger takes the elevator. As an example, when the elevator car 110-1 is parked, the passenger 90 waiting for an elevator at the elevator landing area 410 first walks into the elevator car 110-1 and then finds that the elevator car 110-1 is not an assigned elevator car (for example, 110-2), the passenger 90 then returns from the elevator car 110-1 into the elevator landing area 410.

In one embodiment, the personal mobile terminal 200 or the movement determination module 250 thereof is configured to determine that the passenger 90 moves from the elevator car 110-1 into the elevator landing area after taking the elevator when the signal strength of the first wireless signal received by the personal mobile terminal 200 or the movement determination module 250 thereof changes from greater than or equal to the relatively strong first predetermined value to zero or relatively weak and the first floor information received by the personal mobile terminal 200 or the movement determination module 250 thereof upon the change differs from the first floor information received by the personal mobile terminal 200 or the movement determination module 250 thereof prior to the change. The personal mobile terminal 200 or the movement determination module 250 thereof is further configured to determine that the passenger 90 moves from the elevator car 110-1 into the elevator landing area and this does not happen after the passenger 90 takes the elevator when the signal strength of the first wireless signal received by the personal mobile terminal 200 or the movement determination module 250 thereof changes from greater than or equal to the relatively strong first predetermined value to zero or relatively weak and the first floor information received by the personal mobile terminal 200 or the movement determination module 250 thereof upon the change does not differ from the first floor information received by the personal mobile terminal 200 or the movement determination module 250 thereof prior to the change.

In the movement determination process or the movement determination method, it can be determined whether or not the passenger moves from the elevator car 110 toward the elevator landing area 410 through the change in the signal strength of the received first wireless signal; through comparing with the first floor information of the first wireless signal received previously, it can be determined whether or not the passenger travels together with the first elevator car 110 before leaving the elevator car, so that it can be determined whether or not the passenger 90 moves from the elevator car 110-1 into the elevator landing area 410 after taking the elevator. The above first floor information of the first wireless signal received prior to the change is received when the RRSI indicates "strong", i.e., when the signal strength is kept greater than or equal to the first predetermined value. This further indicates that the passenger 90 receives the changing first floor information inside the elevator car 110.

Continuing with FIGS. 1-3, in another alternative embodiment, the first wireless signal module 130 is coupled with the elevator controller 140. Moreover, during the running of each elevator car 110, the first wireless signal module 130 is able to obtain the traveling direction information of the elevator car 110 from the elevator controller 140 in real time. For example, when the elevator travels upward, the traveling direction information is "travel upward"; when the elevator travels downward, the traveling direction information is "travel downward; when the elevator is parked at a certain floor, the traveling direction information is "not traveled"; and the traveling direction information is packaged into a wireless data signal to be broadcasted in the form of the first wireless signal.

Therefore, the first wireless signal module 130-1 continuously broadcasts the traveling direction information through the first wireless signal. For example, in the process of the elevator car 110-1 traveling downward from the floor (N+x) to the floor N, the first wireless signal module 130-1 continuously broadcasts the traveling direction information "travel downward" until the elevator car 110-1 is parked at the floor N, and the personal mobile terminal 200 will be able to continuously receive the traveling direction information before the landing door is opened. The personal mobile terminal 200 or the movement determination module 250 thereof is configured to determine the movement of the passenger 90 relative to the elevator landing area 410 based on the change in the signal strength of the received first wireless signal, and also determine whether or not the movement of the passenger is performed after the passenger takes the elevator based on the change in the traveling direction information of the received first wireless signal. In one embodiment, the personal mobile terminal 100 or the movement determination module 250 thereof is further configured to determine that the passenger 90 moves from the elevator car 110 into the elevator landing area 410 after taking the elevator when the signal strength of the first wireless signal received by the personal mobile terminal 100 or the movement determination module 250 thereof changes from greater than or equal to the relatively strong first predetermined value to zero or relatively weak and the traveling direction information received prior to the change changes from "travel upward" or "travel downward" to "not traveled". The personal mobile terminal 100 or the movement determination module 250 thereof is further configured to determine that the passenger 90 moves from the elevator car 110 into the elevator landing area 410 and this does not happen after the passenger 90 takes the elevator when the signal strength of the first wireless signal received by the personal mobile terminal 100 or the movement determination module 250 thereof changes from greater than or equal to the relatively strong first predetermined value to zero or relatively weak and the traveling direction information received prior to the change is "not traveled".

In the movement determination process or the movement determination method, it can be determined whether or not the passenger moves from the elevator car 110 toward the elevator landing area 410 through the change in the signal strength of the received first wireless signal; and then through comparing with the traveling direction information of the first wireless signal received prior to the movement, it can be determined whether or not the passenger 90 moves from the elevator car 110-1 into the elevator landing area 410 after taking the elevator. The above first floor information of the first wireless signal received prior to the change is received when the RRSI indicates "strong", i.e., when the signal strength is kept greater than or equal to the first predetermined value. This further indicates that the passenger 90 receives the changing traveling direction information inside the elevator car 110.

In the above embodiment, when the passenger 90 starts moving away from the first wireless signal module 130, based on transmission characteristics of wireless signals, the signal strength of the first wireless signal received by the personal mobile terminal 200 is progressively weakened substantially. Therefore, in the process of the above signal strength of the first wireless signal changing from greater than or equal to the relatively strong first predetermined value to zero or relatively weak, the change may optionally be substantially progressive. For example, the signal strength is changed in a substantially linearly declining manner or changed in a progressive curve-declining manner. In this way, situations such as the signal strength changing "abruptly" which do not represent that the passenger 90 moves from the elevator car 110 toward the elevator landing area 410 can be ruled out, which is advantageous to increase the accuracy of the judgment.

It should be noted that the first predetermined value is selected as a value representative of the signal strength value of the first wireless signal received by the personal mobile terminal 200 when the passenger is or may be likely inside the elevator car, for example, a value of the signal strength of the first wireless signal received by the personal mobile terminal 200 when the distance from the passenger 90 to the first wireless signal module 130 is a certain value in the range of 0.7-1 meter, or a value of the signal strength of the first wireless signal received by the personal mobile terminal 200 when the corresponding passenger 90 is inside the elevator car 110. In general, when the landing door is closed, the personal mobile terminal 200 outside the elevator car 110 would not be able to receive the corresponding first wireless signal or the received first wireless signal is relatively weak.

In the present application, the signal strength of the first wireless signal being relatively weak means that the signal strength of the first wireless signal is at least smaller than the first predetermined value. In the case that the signal strength of the first wireless signal is smaller than the first predetermined value, it indicates that the passenger is not or may probably not be inside the elevator car 110 and is in the elevator landing area 410 outside the elevator car 110.

Continuing with FIGS. 1 and 2, in one embodiment, the movement determination apparatus 10 further comprises a second wireless signal module 120 installed in each elevator landing area 410. The second wireless signal module 120 is used for broadcasting a second wireless signal, for example, continuously broadcasting a data signal of second floor information of the elevator landing area 410 where the second wireless signal module 120 is located, so that once entering the elevator landing area 410, the personal mobile terminal 200 can continuously receive the second floor information. Therefore, the personal mobile terminal 200 or the movement determination module 250 thereof may be configured to determine that the passenger 90 moves from the elevator car 110 into the elevator landing area 410 where the second wireless signal module 120 is installed when the signal strength of the first wireless signal received by the personal mobile terminal 200 or the movement determination module 250 thereof changes from greater than or equal to the relatively strong first predetermined value to zero or relatively weak, the second floor information of the second wireless signal is not received by the personal mobile terminal 200 or the movement determination module 250 thereof prior to the change, and the second floor information of the second wireless signal received after the change does not differ from the first floor information of the first wireless signal received by the personal mobile terminal 200 or the movement determination module 250 thereof previously.

Exemplarily, in one movement determination method or manner, if the passenger 90 walks out of the elevator car 110 after taking the elevator, the landing door is opened first generally and then the passenger 90 walks out of the elevator car. For example, when the elevator car 110 moves to and stops at the Nth floor, before the passenger 90 walks out of the elevator car 110, the mobile terminal 200 is able to continuously receive the first floor information of the floor (for example, the floor N) where the elevator car 110-1 is currently located that is continuously broadcasted by the first wireless signal module 130-1 through the first wireless signal; after the landing door is opened, the signal strength of the first wireless signal received by the personal mobile terminal 200 changes from greater than or equal to the relatively strong first predetermined value to zero or relatively weak, and this change process indicates that the passenger 90 is in the process of moving from the elevator car 110 into the elevator landing area 410; after the change, the personal mobile terminal 200 will be able to receive the second floor information (for example, the floor N) broadcasted by the second wireless signal module 120; the second floor information is compared with the previously received first floor information, and if they are the same, for example, both are the floor N, it is determined that the passenger 90 moves from the elevator car 110 into the elevator landing area 410 where the second wireless signal module 120 is located after taking the elevator.

The movement determination apparatus 10 according to the embodiment of the present invention may also be used for determining whether or not the passenger moves out of the elevator landing area. In one embodiment, while receiving the second wireless signal, the personal mobile apparatus 200 also determines the strength of the received second wireless signal through the signal strength determination module 230 (for example, the RSSI). The personal mobile apparatus 200 or the movement determination module 250 thereof is also configured to determine that the passenger moves substantially out of the elevator landing area 410 when the signal strength of the second wireless signal received by the personal mobile apparatus 200 or the movement determination module 250 thereof changes from greater than or equal to a second predetermined value to zero or relatively weak. The second predetermined value may correspond to the signal strength of the second wireless signal received by the personal mobile apparatus 200 at an exit location of the elevator landing area, or a signal strength threshold of a second wireless connection 320 for transmitting an elevator calling request command of the passenger 90 that is automatically established in the process of the personal mobile apparatus 200 approaching the elevator landing area 410 from outside the elevator landing area 410.

Exemplarily, in one movement determination method or manner, after moving into the elevator landing area 410, the passenger 90 usually may probably leave the elevator landing area 410 or even leave the building. In the process of walking out of the elevator landing area 410, the passenger 90 continuously moves away from the second wireless signal module 120. Therefore, the signal strength of the second wireless signal received by the personal mobile terminal 200 will change from greater than or equal to the second predetermined value to zero or relatively weak. If this does occur, it can be determined that the passenger 90 moves substantially out of the elevator landing area 410.

When the passenger 90 moves substantially out of the elevator landing area 410, it is generally not required to perform an automatic elevator calling operation. Therefore, the personal mobile terminal 200 is further configured to automatically enter a sleep mode when the movement of the passenger to the location that is substantially outside the elevator landing area is determined. In the sleep mode, the personal mobile terminal 200 does not automatically perform the functions of the embodiments of the present invention. When the passenger again enters the elevator landing area 410 the next time, the personal mobile terminal 200 can be waken up from the sleep mode by the received second wireless signal, so as to automatically perform the functions of the embodiments of the present invention, for example, perform the automatic elevator calling operation again.

The movement determination apparatus 10 of the embodiment of the present invention can be applied to an elevator system 100 of the embodiment of the present invention described below, which can achieve an automatic elevator calling operation in a completely hand-free manner, and thus ineffective elevator calling operations can be effectively avoided.

As shown in FIGS. 1 and 2, in order to obtain the elevator calling request command from each elevator landing area 410, a second wireless signal module 120 is provided in the elevator system 100. The second wireless signal module 120 may be installed in each elevator landing area 410 of the elevator system 100 (as shown in FIG. 2). It should be understood that each elevator landing area 410 may have one or more second wireless signal modules 120 installed so that the second wireless signal transmitted by the second wireless signal module 120 may effectively substantially cover each elevator landing area 410. Specifically, the second wireless signal module 120 may be integrally provided in an elevator calling control panel of the elevator system 100, wherein the elevator calling control panel 12 is generally installed on both sides of the landing door of the elevator landing area 410, and the elevator calling control panel 12 may be provided with elevator calling buttons such as "up" or "down" so that the elevator calling request command can be manually inputted based on the elevator calling control panel 12.

In one embodiment, the second wireless signal module 120 may specifically be a Bluetooth Low Energy (BLE) module. The second wireless signal, for example, may be a BLE signal correspondingly. The second wireless signal may comprise a wake-up signal for waking up the personal mobile terminal 200 and may also comprise an identifier of the second wireless signal module 120 (for example, a Universal Unique Identifier (UUID)). The specific signal form of the second wireless signal is not restrictive. Similarly, the signal strength of the second wireless signal is attenuated with the propagation distance thereof. Therefore, the personal mobile terminal 200 receiving the second wireless signal may substantially determine the distance from the personal mobile terminal 200 to the second wireless signal module 120 according to the signal strength of the second wireless signal. It will be understood that as the passenger walks in the elevator landing area 410, the distance dynamically changes.

Continuing with FIGS. 1 and 2, the elevator system 100 further comprises a plurality of first wireless signal modules 130, each of which is installed in each elevator car 110. For example, one first wireless signal module 130-1 is provided in the elevator car 110-1 and one first wireless signal module 130-2 is provided in the elevator car 110-2. In one embodiment, the first wireless signal module is installed and integrally provided on the destination floor registration control panel in the elevator car 110.

It should be noted that each of the second wireless signal modules 120 and the first wireless signal modules 130 in the movement determination apparatus 10 or the elevator system 100 is coupled with the elevator controller 140, for example, indirectly coupled (for example, connected via an RSL bus) to the elevator controller 140 through the elevator calling control panel and the destination floor registration control panel, respectively. Therefore, the elevator calling request command and the destination floor registration command respectively received by the second wireless signal module 120 and the first wireless signal module 130 may be transmitted to the elevator controller 140.

Continuing with FIG. 1, there may be a plurality of movement determination apparatuses 10 or personal mobile terminals 200 carried by the passengers 90 in the elevator system 100, for example, personal mobile terminals 200-1 and 200-2 carried by two passengers, respectively. Each personal mobile terminal 200 may establish a second wireless connection 320 with the second wireless signal module 120, and each personal mobile terminal 200 may establish a first wireless connection 330 with the first wireless signal module 130.

Continuing with FIGS. 1-3, the personal mobile terminal 200 may be various types of intelligent terminals that have a wireless connection function and are convenient for a passenger to carry. The personal mobile terminal 200 may be provided with a memory, a processor having a computing function, and the like. Specifically, the personal mobile terminal 200 may be a smart phone, a wearable smart device (for example, a smart bracelet, etc.), a Personal Digital Assistant (PAD), or the like, on which a corresponding application program (for example, an APP) may be installed to achieve functions thereof.

In the elevator system 100, when the second wireless signal module 120 broadcasts the second wireless signal, the personal mobile terminal 200 carried by the passenger approaching the second wireless signal module 120 will be able to automatically receive the second wireless signal and automatically establish the second wireless connection 320 with the corresponding second wireless signal module 120 based on the second wireless signal. Moreover, upon the establishment of the second wireless connection 320, the personal mobile terminal 200 transmits the elevator calling request command regarding the elevator calling direction (for example, an elevator calling request command "travel upward" or "travel downward"). The second wireless signal module 120 receives the elevator calling request command regarding the elevator calling direction transmitted from the person mobile terminal 200 and may further transmit the elevator calling request command to the elevator controller 140 so that the elevator controller 140 controls the running of one or more elevator cars 110 in the elevator system 100 based on the elevator calling request command. In this way, the elevator calling request command automatically transmitted by the personal mobile terminal 200 can replace the elevator calling request command inputted by manually pressing the elevator calling button, and the above process can be automatically achieved without operating the personal mobile terminal 200 by the passenger. This completely achieves the automatic input of an elevator calling request command to the elevator system 100 in a passenger hand-free manner, and the implementation process is simple and convenient, which greatly improves the passenger's experience.

It should be noted that each second wireless signal module 120 establishes the second wireless connection 320 with only one personal mobile terminal 200 at a certain time, and each second wireless signal module 120 may successively establish the second wireless connection 320 with the personal mobile terminals 200 carried by a plurality of passengers approaching the second wireless signal module 120 in a chronological order. After establishing the second wireless connection 320 with the second wireless signal module 120 and transmitting the corresponding elevator calling request command, each personal mobile terminal 200 will actively disconnect from the second wireless connection 320 so that the second wireless signal module 120 can automatically establish the second wireless connection 320 with a personal mobile terminal 200 of the next passenger. In one embodiment, the second wireless signal module 120 is configured to return a second confirmation message to the corresponding personal mobile terminal 200 after receiving the elevator calling request command. The second confirmation message indicates that the elevator calling request command is accepted by the elevator system 100 successfully. The personal mobile terminal 200 is configured to actively disconnect from the second wireless connection 320 based on the received second confirmation message.

It should be noted that "the elevator calling request command regarding the elevator calling direction" in the present invention does not contain the destination floor information of the passenger, or even if the destination floor information is comprised therein, it is not recognized or used by the elevator controller 140. Therefore, in the embodiment of the present invention, the first wireless connection 330 with the personal mobile terminal 200 is established also depending on the first wireless signal module 130.

Continuing with FIG. 1, in the elevator system 100 or the movement determination apparatus 10, when the first wireless signal module 130 broadcasts the first wireless signal, the personal mobile terminal 200 carried by the passenger 90 approaching the first wireless signal module 130 (for example, when the passenger 90 is moving toward the inside of the elevator car) will continue to be able to automatically receive the first wireless signal (at this time, the second wireless connection 320 previously established between the personal mobile terminal 200 and the second wireless signal module 120 has been already disconnected). Moreover, the personal mobile terminal 200 automatically establishes the first wireless connection 330 with the corresponding first wireless signal module 130 based on the first wireless signal. Upon the establishment of the first wireless connection 330, the personal mobile terminal 200 transmits a destination floor registration command regarding the destination floor information, the first wireless signal module 130 receives the elevator calling request command regarding the elevator calling direction transmitted from the personal mobile terminal 200, and the first wireless signal module 130 may further transmit the destination floor registration command to the elevator controller 140 so that the elevator controller 140 controls the running of one or more elevator cars 110 in the elevator system 100 based on the destination floor registration command. In this way, the destination floor registration command automatically transmitted by the personal mobile terminal 200 can replace the destination floor registration command inputted by manually pressing the floor button, and the above process can be automatically achieved without operating the personal mobile terminal 200 by the passenger. In other words, this achieves the automatic input of a destination floor registration command to the elevator system 100 in a passenger hand-free manner, and the implementation process is also simple and convenient, which greatly improves the passenger's experience.

It should be noted that each first wireless signal module 130 establishes the first wireless connection 330 with only one personal mobile terminal 200 at a certain time, and each first wireless signal module 130 may successively establish the first wireless connection 330 with the personal mobile terminals 200 carried by a plurality of passengers 90 approaching the first wireless signal module 130 in a chronological order. After establishing the first wireless connection 330 with the first wireless signal module 130 and transmitting the corresponding destination floor registration command, each personal mobile terminal 200 will actively disconnect from the first wireless connection 330 so that the first wireless signal module 130 can establish the first wireless connection 330 with a personal mobile terminal 200 of the next passenger 90. In one embodiment, the first wireless signal module 130 is configured to return a first confirmation message to the corresponding personal mobile terminal 200 after receiving the destination floor registration command. The first confirmation message indicates that the destination floor registration command is accepted by the elevator system 100 successfully. The personal mobile terminal 200 is configured to actively disconnect from the first wireless connection 330 based on the received first confirmation message.

It should be understood that the above process between the establishment of the second wireless connection 320 and the disconnection of the second wireless connection 320 can be completed in a short period of time. Similarly, the above process between the establishment of the first wireless connection 330 and the disconnection of the first wireless connection 330 can also be completed in a short period of time, for example, within a time range in an order of magnitudes of milliseconds, so that one second wireless signal module 120 or first wireless signal module 130 can complete the sequential second wireless connection 320 or first wireless connection 330 with multiple personal mobile terminals 200 in a short period of time. The multiple personal mobile terminals 200 can substantially simultaneously complete the elevator calling operation within a short period of time.

The elevator system 100 or the movement determination apparatus 10 in the above embodiments can achieve an automatic elevator calling operation in a completely hand-free manner. For example, in the process of a certain passenger 90 entering the hall of the building and reaching the destination floor, as long as the passenger 90 carries the personal mobile terminal 200, the passenger 90 can take the elevator to the destination floor without any operation. As shown in FIG. 2, if the passenger 90 moves toward the elevator landing area 410 from other areas of the building, when the distance from the personal mobile terminal 200 to the second wireless signal module 120 in the elevator landing area 410 is less than or equal to a second distance threshold while the signal strength of the received second wireless signal changes from zero or relatively weak to greater than or equal to a relatively strong second predetermined value, the second wireless connection 320 will be established at this point and the corresponding elevator calling request command is automatically transmitted. The elevator controller 140 will control the traveling of the elevator car based on the elevator calling request command, for example, control the elevator car 110-1 to park at a floor or a landing station corresponding to the elevator landing area 410. However, if the passenger 90 moves out of the elevator car 110-1 parked at the floor and into the elevator landing area 410, the personal mobile terminal 200 carried by the passenger 90 automatically establishes the second wireless connection 320 with the second wireless signal module 120 and transmits the elevator calling request command to the second wireless signal module 120. Obviously, the elevator calling request command might easily lead to ineffective running of the elevator, which affects the running efficiency of the elevator system 100.

In the movement determination apparatus 10 and the movement determination method thereof according to the embodiments of the present invention, a determination result regarding the movement of the passenger relative to the elevator landing area 410 may also be transmitted to the elevator system 100 at the same time. In the elevator system 100 according to one embodiment of the present invention, the above determination result may be transmitted to the elevator controller 140 to, for example, determine that the personal mobile terminal 200 is located in the elevator landing area 410 when the passenger 90 moves from the elevator car 110 into the elevator landing area 410 after taking the elevator. Therefore, through the wireless communication module 210 of the personal mobile terminal 200, the personal mobile terminal 200 may actively establish the wireless connection with the second wireless signal module 120 and transmit the determination result to the elevator controller 140. The elevator controller 140 is further configured to select the determination result regarding the movement of the passenger 90 relative to the elevator landing area 410 transmitted from the movement determination apparatus 10 as a judgment condition to judge whether or not to cancel the elevator calling request command from the personal mobile terminal 200 of the corresponding passenger 90.

Exemplarily, when the passenger 90 moves from the elevator car 110 into the elevator landing area 410, the personal mobile terminal 200 automatically transmits an elevator calling request command with an upward elevator calling direction to the second wireless signal module 120 in the elevator landing area 410 and transmits the movement determination result simultaneously. When the elevator controller 140 receives especially the determination result that the passenger 90 moves from the elevator car 110 into the elevator landing area 410 after taking the elevator, the elevator controller 140 may cancel or reject the elevator calling request command with the upward elevator calling direction corresponding to the passenger. When the elevator controller 140 receives especially the determination result that the passenger 90 moves from the elevator car 110 into the elevator landing area 410 but this does not happen after the passenger 90 takes the elevator, the elevator controller 140 will not cancel or reject the elevator calling request command with the upward elevator calling direction corresponding to the passenger.

It should be understood that the condition for the elevator controller 140 to judge whether or not to cancel or reject the elevator calling request command corresponding to the passenger 90 is not limited to the condition of the determination result transmitted by the personal mobile terminal 200, and may also comprise many other conditions as judgment elements, for example, elevator calling request commands corresponding to other passengers, the current operating condition of the elevator car, and the like.

In the elevator system 100 according to another embodiment of the present invention, the above determination result may not be transmitted to the elevator controller 140. As an alternative, in order to avoid generating an ineffective elevator calling request, when it is determined that the passenger 90 moves from the elevator car 110 into the elevator landing area 410, especially when it is determined that the passenger 90 moves from the elevator car 110 into the elevator landing area 410 after taking the elevator, the transmission of the elevator calling request command is suspended. In this way, even if the personal mobile terminal 200 of the passenger 90 coming out of the elevator car 110 has established the second wireless connection 320 with the second wireless signal module 120 in the elevator landing area 410 and transmits the elevator calling request command, the elevator system 100 also cannot receive the elevator calling request command. The duration of the suspension can be configured according to specific circumstances, for example, configured according to a length of time from the point when a passenger normally starts to walk out of the elevator car 110 to the point when the passenger has completely walked out of the elevator landing area 410, for example, configured within a range of 15 seconds to 1 minute. It will be understood that the passenger 90 can continue to automatically transmit the elevator calling request command based on the personal mobile terminal 200 after the duration of the suspension.

It should be noted that the movement determination apparatus 10 and the movement determination method thereof of the embodiments of the present invention are not limited in the elevator system 100 that can achieve an elevator calling operation in a completely hand-free manner according to the above embodiments. For example, the movement determination apparatus 10 and the movement determination method thereof may also be applied in an elevator system based on another automatic elevator calling operation mode. In the another elevator calling operation mode, the personal mobile terminal may automatically transmit or automatically input an elevator calling request command regarding an elevator calling direction and destination floor information to the elevator system at one time, and the elevator system will assign a corresponding elevator car (a plurality of elevator cars simultaneously exist in the elevator system) for the passenger based on the command and automatically register the destination floor of the passenger in the elevator car. In such an elevator system, if the passenger 90 enters the elevator landing area 410 from the elevator car 110, there is similarly a problem that the assigned elevator car might run inefficiently, which also affects the running efficiency of the entire elevator system. The elevator controller 140 of such an elevator system may also be configured to select the determination result regarding the movement of the passenger 90 relative to the elevator landing area 410 transmitted from the movement determination apparatus 10 as a judgment condition to judge whether or not to cancel the elevator calling request command corresponding to the personal mobile terminal 200 of the passenger 90, or the personal mobile terminal 200 is configured to suspend the transmission of the elevator calling request command so as to avoid inefficient running of the assigned elevator car 110.

In the movement determination apparatus 10 or the elevator system 100 of the above embodiment, the first wireless signal module 130 in each elevator car 110 can continuously broadcast the first wireless signal. The first wireless signal comprises one or more of the following: the first floor information, the traveling direction information, etc. It will be understood that the information changes in real time. Likewise, the second wireless signal module 120 in each elevator landing area 410 can continuously broadcast at least the second floor information. The personal mobile terminal 200 or the movement determination module 250 thereof may comprehensively determine the movement of the passenger 90 relative to the elevator landing area 410 based on the changes in multiple ones of the first floor information, the second floor information, the traveling direction information, etc., such that the determination result regarding the movement may be more accurate.

It should be understood that "wireless connection" herein includes "wireless communication", for example, Bluetooth communication based on a certain Bluetooth protocol.

It will be understood that each block of the block diagram in FIG. 3 or a combination of block diagrams may be achieved by computer program instructions, for example, by a dedicated APP. These computer program instructions may be provided to a processor of a general-purpose computer, a special purpose computer, or other programmable data processing devices to form a machine so that these instructions are executed by the processor of the computer or other programmable data processing devices to create components for implementing functions/operations specified in the one or more block diagrams.

As will be understood by one skilled in the art, the aspects of the present invention may be embodied as a system, a method, or a computer program product. Accordingly, the aspects of the present invention may employ the following forms: an all-hardware embodiment, an all-software embodiment (including firmware, resident software, microcode, etc.), or embodiments that generally may all be referred to herein as "a service," "a circuit," "a circuitry," "a module" and/or "a processing system" and combine software and hardware aspects. Furthermore, the aspects of the present invention may employ the form of a computer program product embodied in one or more computer-readable media on which computer-readable program codes are implemented.

Any combination of one or more computer-readable media may be used. The computer-readable medium may be a computer-readable signal medium or a computer-readable storage medium. The computer-readable storage medium may be but is not limited to, for example, electronic, magnetic, optical, electromagnetic, infrared, or semiconductor systems, devices, or apparatuses, or any suitable combination of the above. More specific examples (non-exhaustive listings) of the computer-readable storage medium will comprise the following: an electrical connection with one or more wires, a portable computer disk, a hard disk, a Random Access Memory (RAM), a Read-Only Memory (ROM), an Erasable Programmable Read-Only Memory (EPROM or flash memory), optical fibers, a portable Compact Disc Read-Only Memory (CD-ROM), an optical storage apparatus, a magnetic storage apparatus, or any suitable combination of the above. In the context of this document, the computer-readable storage medium may be any tangible medium that can contain or store a program for use by or in connection with an instruction execution system, a device, or an apparatus.

Program codes and/or executable instructions embodied on the computer-readable medium may be transmitted using any suitable medium, including but not limited to wireless transmission, wired transmission, fiber optic cable, RF, etc., or any suitable combination of the above.

Computer program codes for implementing the operations of the aspects of the present invention may be written using any combination of one or more programming languages, including object-oriented programming languages such as Java, Smalltalk, C++, etc., as well as conventional programming languages such as the "C" programming language or similar programming languages. The program codes may be executed entirely on the user's computer (apparatus), partly on the user's computer, as a stand-alone software package, partly on the user's computer and partly on a remote computer, or entirely on a remote computer or a server. In the latter case, the remote computer may be connected to the user's computer through any type of network including a Local Area Network (LAN) or a Wide Area Network (WAN), or may be connected to an external computer (e.g., connected using an Internet service provider via the Internet).

Computer program instructions may be provided to a processor of a general-purpose computer, a processor of a special purpose computer, such as an image processor or other programmable data processing devices to produce a machine such that the instructions executed via the processor of the computer or other programmable data processing devices create a manner to implement the functions/actions specified in one or more of the blocks of the flowcharts and/or block diagrams.

Computer program instructions may also be loaded onto a computer, other programmable data processing devices, or other apparatuses to cause a series of operational steps to be performed on the computer, other programmable devices, or other apparatuses to produce a computer-implemented process such that the instructions executed on the computer or other programmable devices provide procedures for implementing the functions and actions specified herein.

It should also be noted that in some alternative implementation manners, the functions/operations illustrated in the blocks may not occur in the order illustrated by the flowchart. For example, two blocks shown in sequence may in fact be executed substantially at the same time or these blocks may sometimes be executed in reverse order, depending on the functions/operations involved. Although a specific sequence of steps is shown, disclosed and claimed, unless otherwise specified, it should be understood that the steps may be implemented, separated or combined in any order, and will still benefit from the present disclosure.

This specification uses examples to disclose the present invention, including the best mode, and also enables any person skilled in the art to practice the present invention, including making and using any apparatuses or systems and performing any incorporated methods. The patentable scope of the present invention is defined by the claims, and may comprise other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatic elevator calling system, characterized in that the automatic elevator calling system comprises:
    a first wireless signal module installed in an elevator car, which is used for broadcasting a first wireless signal;
    wherein the first wireless signal module is further used for receiving information regarding the movement of a passenger relative to an elevator landing area, and the information regarding the movement is determined based on the change in a signal strength of the first wireless signal received by a personal mobile terminal carried by the passenger;
    characterized in that the first wireless signal further comprises a data signal of current traveling direction information of the elevator car, wherein the traveling direction information comprises: "travel upward", "travel downward", and "not traveled"; and
    the information regarding the movement comprises the movement of the passenger from the elevator car into the elevator landing area after the passenger takes the elevator, which is determined when:
    the signal strength of the received first wireless signal changes from greater than or equal to a relatively strong first predetermined value to zero or relatively weak and the traveling direction information received prior to the change changes from "travel upward" or "travel downward" to "not traveled".

2. The automatic elevator calling system according to claim 1, characterized in that the first wireless signal comprises a data signal of information of a first floor where the elevator car is currently located;
    wherein the information regarding the movement comprises the movement of the passenger from the elevator car into the elevator landing area after the passenger takes the elevator, which is determined when:
    the signal strength of the first wireless signal received by the personal mobile terminal changes from greater than or equal to a relatively strong first predetermined value to zero or relatively weak and the first floor information received by the personal mobile terminal upon the change differs from the first floor information received prior to the change.

3. The automatic elevator calling system according to claim 1, characterized in that the automatic elevator calling system further comprises:
    a second wireless signal module installed in the elevator landing area, which is used for broadcasting a second wireless signal, the second wireless signal comprising a data signal of information of a second floor where the second wireless signal module is located.

4. The automatic elevator calling system according to claim 3, characterized in that the first wireless signal comprises a data signal of information of a first floor where the elevator car is currently located;
    wherein the information regarding the movement comprises the movement of the passenger from the elevator car into the elevator landing area where the second wireless signal module is installed after the passenger takes the elevator, which is determined when:
    the signal strength of the received first wireless signal changes from greater than or equal to a relatively strong first predetermined value to zero or relatively weak, second floor information of the second wireless signal is not received prior to the change, and the second floor information of the second wireless signal received after the change does not differ from the first floor information of the first wireless signal received previously.

5. The automatic elevator calling system according to claim 3, characterized in that the information regarding the movement comprises the movement of the passenger to a location that is substantially outside the elevator landing area, which is determined when:
    a signal strength of the second wireless signal received by the personal mobile terminal changes from greater than or equal to a second predetermined value to zero or relatively weak.

6. The automatic elevator calling system according to claim 1, characterized in that the automatic elevator calling system further comprises:
    a second wireless signal module installed in the elevator landing area, which is used for broadcasting a second wireless signal and automatically establishing a second wireless connection with the personal mobile terminal based on the second wireless signal, and receiving, upon the establishment of the second wireless connection, an elevator calling request command regarding an elevator calling direction transmitted from the personal mobile terminal.

7. The automatic elevator calling system according to claim 6, characterized in that the first wireless signal module is further used for automatically establishing a first wireless connection with the personal mobile terminal based on the first wireless signal, and receiving, upon the establishment of the first wireless connection, a destination floor registration command transmitted from the personal mobile terminal.

8. The automatic elevator calling system according to claim 1, characterized in that the second wireless signal module and/or the first wireless signal module is a Bluetooth low energy module.

9. An elevator system, characterized in that the elevator system comprises:
    the automatic elevator calling system according to claim 1; and
    an elevator controller, which is used for controlling running of one or more elevator cars in the elevator system.

10. The elevator system according to claim 9, characterized in that the elevator controller is configured to judge whether or not to cancel an elevator calling request command corresponding to the personal mobile terminal of the passenger based on the information regarding the movement.

11. A method for determining the movement of a passenger relative to an elevator landing area, characterized in that the method comprises steps of:

receiving a first wireless signal, wherein the first wireless signal is broadcasted from an elevator car;

determining a signal strength of the received first wireless signal; and determining the movement of the passenger relative to the elevator landing area based on the change in the signal strength of the first wireless signal;

characterized in that in the step of determining the movement, the movement of the passenger from the elevator car into the elevator landing area is determined when the signal strength of the received first wireless signal changes from greater than or equal to a relatively strong first predetermined value to zero or relatively weak;

wherein the first wireless signal further comprises a data signal of current traveling direction information of the elevator car, wherein the traveling direction information comprises: "travel upward", "travel downward", and "not traveled"; and in the step of determining the movement, the movement of the passenger from the elevator car into the elevator landing area after the passenger takes the elevator is determined when the signal strength of the received first wireless signal changes from greater than or equal to a relatively strong first predetermined value to zero or relatively weak and the traveling direction information received prior to the change changes from "travel upward" or "travel downward" to "not traveled".

12. The method according to claim 11, characterized in that the first wireless signal comprises a data signal of information of a first floor where the elevator car is currently located; and in the step of determining the movement, the movement of the passenger from the elevator car into the elevator landing area after the passenger takes the elevator is determined when the signal strength of the received first wireless signal changes from greater than or equal to a relatively strong first predetermined value to zero or relatively weak and the first floor information received upon the change differs from the first floor information received prior to the change.

13. The method according to claim 11, characterized in that the method further comprises a step of receiving a second wireless signal, wherein the second wireless signal is broadcasted from a location point in the elevator landing area outside the elevator car, and the second wireless signal comprises a data signal of information of a second floor where a second wireless signal module is located.

14. The method according to claim 13, characterized in that the first wireless signal comprises a data signal of information of a first floor where the elevator car is currently located;

wherein in the step of determining the movement, the movement of the passenger from the elevator car into the elevator landing area where the second wireless signal module is located after the passenger takes the elevator is determined when the signal strength of the received first wireless signal changes from greater than or equal to a relatively strong first predetermined value to zero or relatively weak, second floor information of the second wireless signal is not received prior to the change, and the second floor information of the second wireless signal received after the change does not differ from the first floor information of the first wireless signal received previously.

15. The method according to claim 13, characterized in that the method further comprises determining a signal strength of the received second wireless signal.

16. The method according to claim 15, characterized in that the method further comprises a step of determining the movement of the passenger to a location that is substantially outside the elevator landing area when the signal strength of the received second wireless signal changes from greater than or equal to a second predetermined value to zero or relatively weak.

17. The method according to claim 16, characterized in that the method further comprises a step of automatically entering a sleep mode when the movement of the passenger to the location that is substantially outside the elevator landing area is determined.

18. The method according to claim 11, characterized in that the signal strength of the first wireless signal changing from greater than or equal to the relatively strong first predetermined value to zero or relatively weak refers to substantially progressively changing from greater than or equal to the relatively strong first predetermined value to zero or relatively weak.

19. The method according to claim 11, characterized in that transmission of an elevator calling request command regarding an elevator calling direction is suspended when the movement of the passenger from the elevator car into the elevator landing area is determined.

20. The method according to claim 11, characterized in that a third wireless connection is actively established with the corresponding second wireless signal module installed in the elevator landing area when the movement of the passenger from the elevator car into the elevator landing area is determined, so as to transmit a determination result that the passenger moves from the elevator car into the elevator landing area.

21. A computer-readable storage medium having a computer program stored thereon, characterized in that the program is executable by a processor to achieve steps of the method according to claim 11.

* * * * *